(12) United States Patent
Wu et al.

(10) Patent No.: US 10,295,698 B2
(45) Date of Patent: May 21, 2019

(54) MULTI-COMPONENT INDUCTION LOGGING SYSTEMS AND METHODS USING SELECTED FREQUENCY INVERSION

(71) Applicant: HALLIBURTON ENERGY SERVICES, INC., Houston, TX (US)

(72) Inventors: Dagang Wu, Katy, TX (US); Junsheng Hou, Kingwood, TX (US); Burkay Donderici, Houston, TX (US); Luis E. San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 289 days.

(21) Appl. No.: 14/896,825

(22) PCT Filed: Jun. 19, 2014

(86) PCT No.: PCT/US2014/043203
§ 371 (c)(1),
(2) Date: Dec. 8, 2015

(87) PCT Pub. No.: WO2015/152955
PCT Pub. Date: Oct. 8, 2015

(65) Prior Publication Data
US 2016/0131791 A1    May 12, 2016

Related U.S. Application Data

(60) Provisional application No. 61/974,935, filed on Apr. 3, 2014.

(51) Int. Cl.
*G01V 3/38* (2006.01)
(52) U.S. Cl.
CPC .................................... *G01V 3/38* (2013.01)

(58) Field of Classification Search
CPC ............. G01V 3/38; G01V 3/12; G06F 19/00
(Continued)

(56) References Cited

U.S. PATENT DOCUMENTS 4,302,723 A    11/1981 Moran
5,867,806 A    2/1999 Strickland et al.
(Continued)

FOREIGN PATENT DOCUMENTS

WO    2013/036509    3/2013
WO    2013/066297    5/2013
WO    2014/011190    1/2014

OTHER PUBLICATIONS

Hou, Junsheng et al., "Method for Multi-Frequency Inversion of Multicomponent Induction Log Data," dated Mar. 19, 2013, Halliburton Energy Services Inc., 2013-IP-072294.
(Continued)

*Primary Examiner* — John H Le
(74) *Attorney, Agent, or Firm* — Benjamin Fite; C. Tumey Law Group PLLC

(57)    ABSTRACT

Formation properties may be more efficiently derived from measurements of multi-frequency, multi-component array induction tools, by emphasizing the measurements associated with shorter spacings/lower frequencies in certain regions and short-to-middle spacings/higher frequencies in other regions. In at least one embodiment, a disclosed logging system includes a logging tool that when conveyed along a borehole through a formation obtains multi-component transmit-receive antenna coupling measurements with multiple arrays having different antenna spacings; and a processing system that operates on the measurements. The processing system derives from said measurements one or more formation parameter estimates; determines measurement weight coefficients for a cost function based on said one or more formation parameter estimates; and inverts said
(Continued)

measurements with said cost function to obtain one or more enhanced parameter estimates.

18 Claims, 8 Drawing Sheets

(58) Field of Classification Search
USPC .......... 702/6, 7, 11; 324/334, 338, 339, 373
See application file for complete search history.

(56) References Cited

U.S. PATENT DOCUMENTS

| | | | |
|---|---|---|---|
| 5,886,526 | A | 3/1999 | Wu |
| 6,098,019 | A | 8/2000 | Hakvoort et al. |
| 6,163,155 | A | 12/2000 | Bittar |
| 6,369,575 | B1 | 4/2002 | Eisemann et al. |
| 6,466,872 | B1 | 10/2002 | Kriegshauser et al. |
| 6,819,111 | B2 | 11/2004 | Fanini et al. |
| 6,885,943 | B2 | 4/2005 | Bittar et al. |
| 6,950,749 | B2 | 9/2005 | Frenkel et al. |
| 6,998,844 | B2 | 2/2006 | Omeragic et al. |
| 7,313,479 | B2 | 12/2007 | Frenkel et al. |
| 7,382,135 | B2 | 6/2008 | Li et al. |
| 7,599,825 | B2 | 10/2009 | Yang et al. |
| 7,619,540 | B2 | 11/2009 | Bonner et al. |
| 7,659,722 | B2 | 2/2010 | Bittar |
| 7,952,358 | B2 | 5/2011 | Wang |
| 7,990,153 | B2 | 8/2011 | Streinz et al. |
| 8,433,518 | B2 | 4/2013 | Omeragic et al. |
| 2002/0173914 | A1 | 11/2002 | Zhang et al. |
| 2003/0093223 | A1 | 5/2003 | Zhang et al. |
| 2005/0083061 | A1 | 4/2005 | Tabanou et al. |
| 2010/0156424 | A1 | 6/2010 | Bittar et al. |
| 2010/0198569 | A1 | 8/2010 | Wu et al. |
| 2011/0308811 | A1 | 12/2011 | Ghayour et al. |
| 2013/0046474 | A1 | 2/2013 | Bittar et al. |
| 2013/0080058 | A1 | 3/2013 | Wu et al. |
| 2013/0105224 | A1 | 5/2013 | Donderici et al. |
| 2014/0012505 | A1* | 1/2014 | Smith .................. G01V 3/12 702/2 |

OTHER PUBLICATIONS

Tang, Yumei, Appl No. PCT/US2014/071101, "Shoulder Effect Reduction," Filed Dec. 18, 2014.
PCT International Search Report and Written Opinion, dated Dec. 23, 2014, Appl No. PCT/US2014/043203,"Multi-Component Induction Logging Systems and Methods Using Selected-Frequency Inversion," Filed Jun. 19, 2014, 17 pgs.
PCT International Search Report and Written Opinion, dated Sep. 8, 2015, Appl No. PCT/US2014/071101, "Shoulder Effect Reduction," Filed Dec. 18, 2014, 15 pgs.
Bittar, Michael, "New Tool Optimizes Wellbore Placement," Exploration & Production Magazine, Jul. 31, 2007, p. 1-4, Hart Energy, Houston, Texas, United States, Available at: http://www.epmag.com/EP-Magazine/archive/New-tool-optimizes-wellbore-placement_537.
Dautel, Mike, et al., "Modern Azimuthal Resistivity Tools and Their Application to Mature Field Development," SPWLA-INDIA 3rd Annual Logging Symposium Mumbai, India, Nov. 2011, p. 1-14, Society of Petrophysicists and Well Log Analysts, Houston, Texas, United States, Available at: http://www.spwlaindia.org.
Li, Qiming, et al., "New Directional Electromagnetic Tool for Proactive Geosteering and Accurate Formation Evaluation While Drilling," SPWLA 46th Annual Logging Symposium Conference Paper, Jun. 2005, p. 1-16, Society of Petrophysicists and Well Log Analysts, Houston, Texas, United States, Available at: https://www.onepetro.org/conference-paper/SPWLA-2005-F.
"A New Multi-Frequency Triaxial Array Induction Tool for Enhancing Evaluation of Anisotropic Formations and its Field Testing" by Junsheng Hou et al. Dated Jun. 22, 2013. Presented at SPWLA 54th Annual Logging Symposium.
Extended European Search Report for International Application No. PCT/US2014/043203 dated Nov. 2, 2017.

* cited by examiner

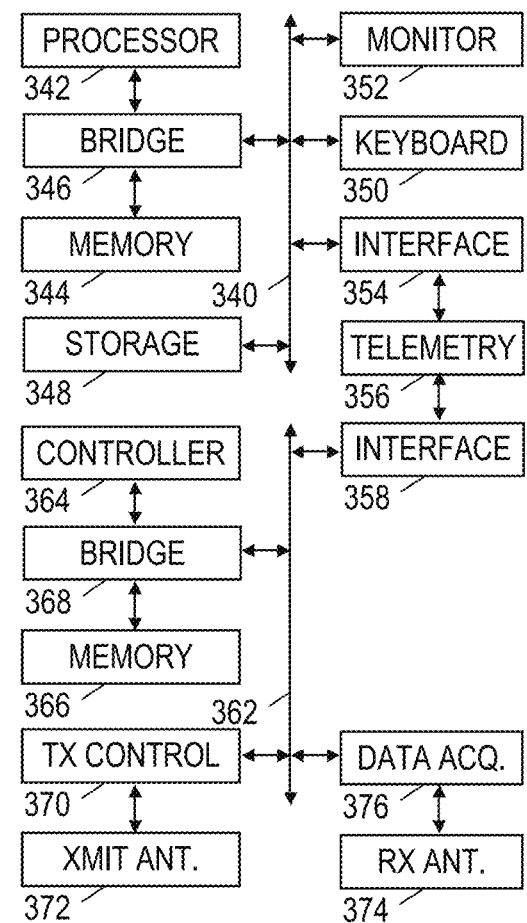

FIG. 5B
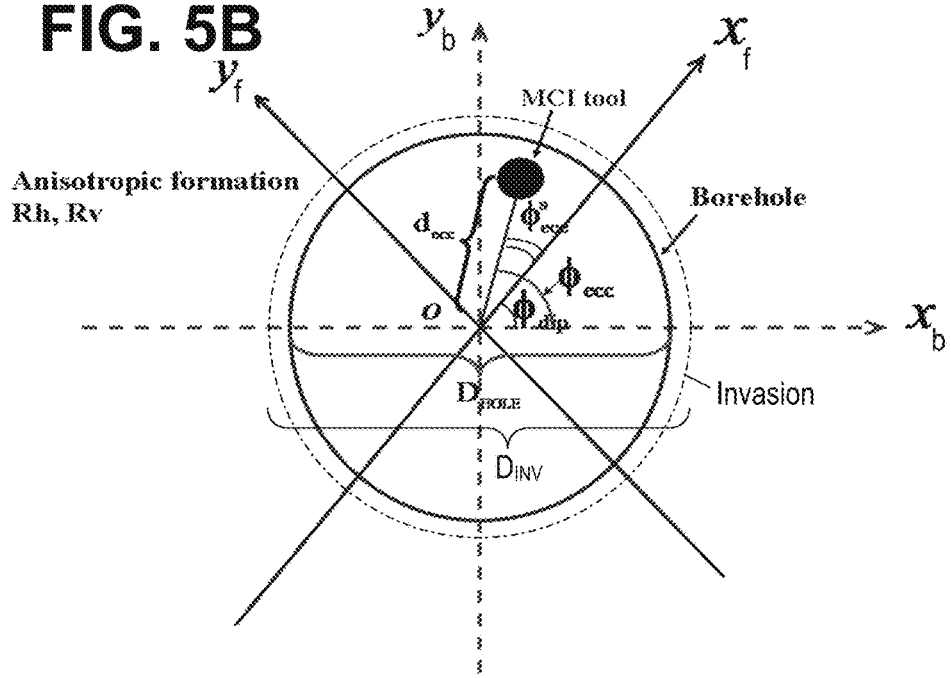
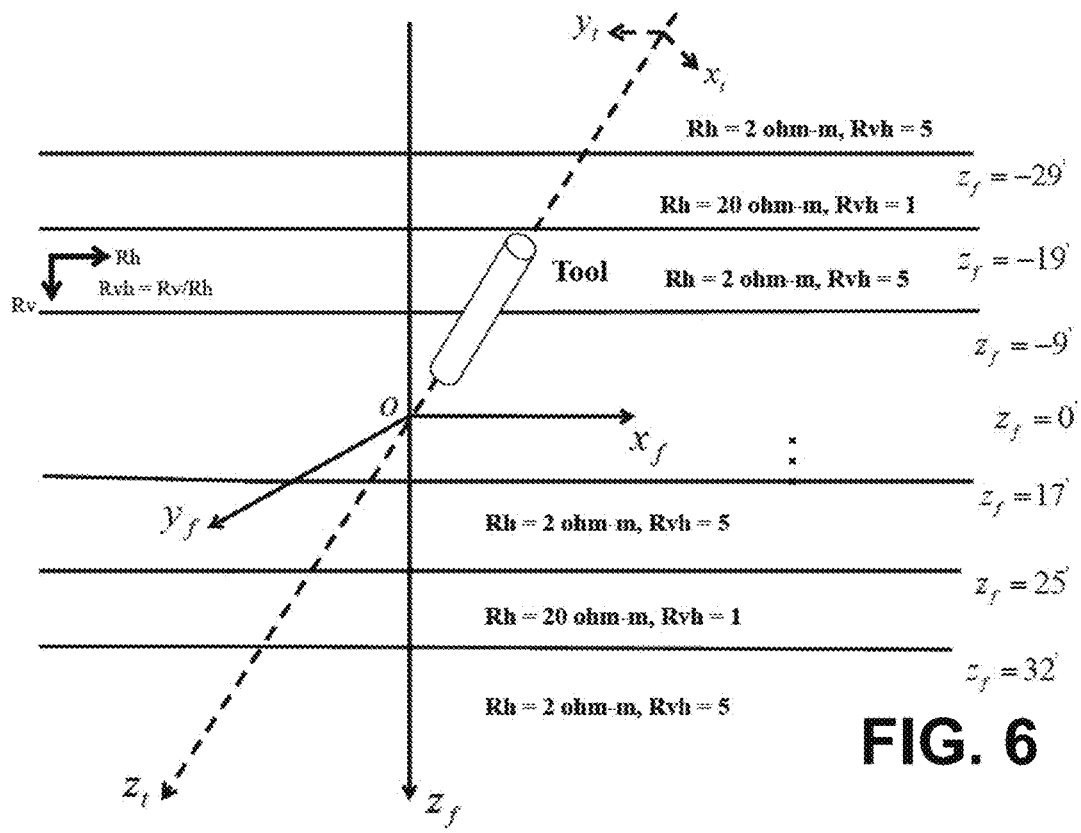
FIG. 6

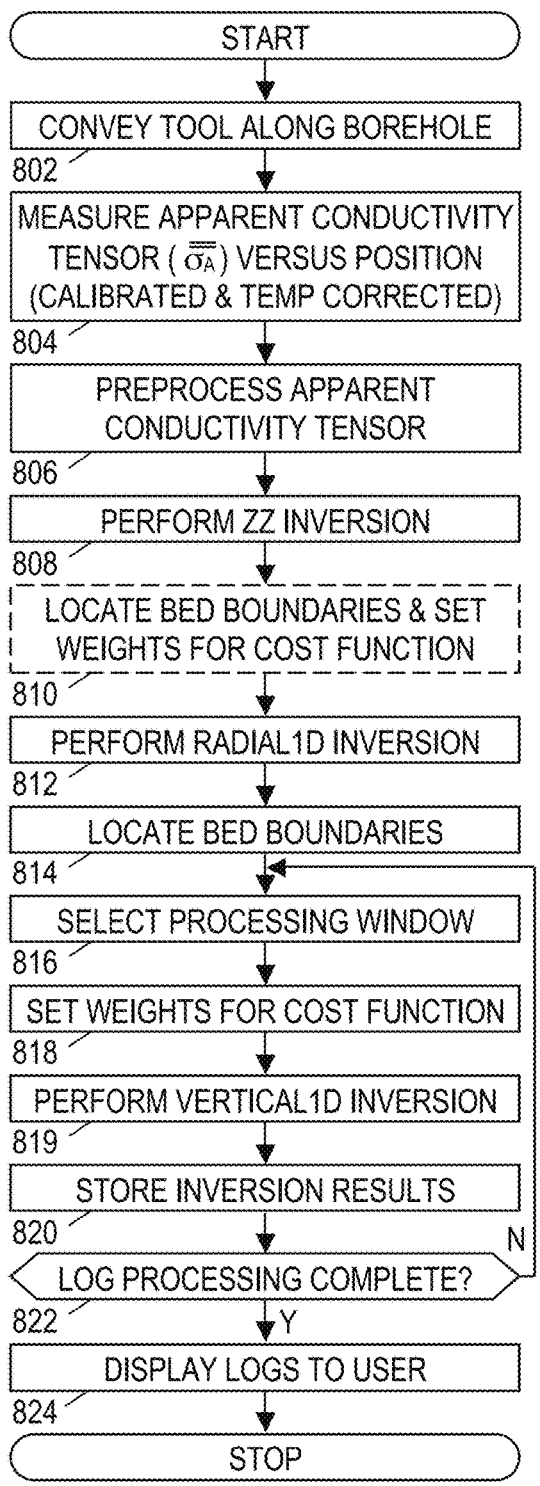
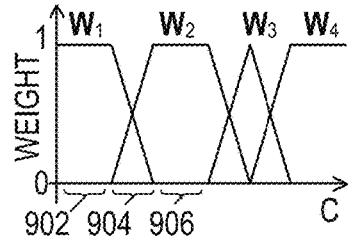
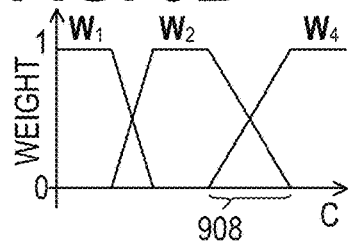
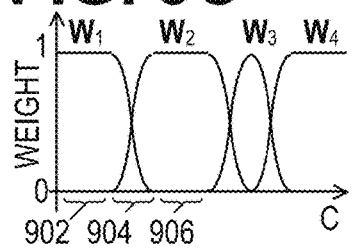
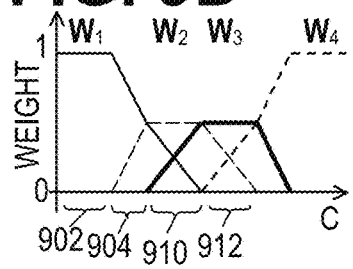

MULTI-COMPONENT INDUCTION LOGGING SYSTEMS AND METHODS USING SELECTED FREQUENCY INVERSION

CROSS-REFERENCE TO RELATED APPLICATION

This application claims priority to Provisional U.S. Application Ser. No. 61/974,935, titled "Multi-Component Induction Logging Systems and Methods Using Selected-Frequency Inversion" and filed Apr. 3, 2014 by Dagang Wu, Junsheng Hou, Burkay Donderici and Luis E. San Martin, which is incorporated herein by reference.

BACKGROUND

In the field of petroleum well drilling and logging, resistivity logging tools are frequently used to provide an indication of the electrical resistivity of rock formations surrounding an earth borehole. Such information regarding resistivity is useful in ascertaining the presence or absence of hydrocarbons. A typical induction-based resistivity logging tool includes a transmitter antenna and multiple receiver antennas located at different distances from the transmitter antenna along the axis of the tool. The transmitter antenna creates electromagnetic fields in the surrounding formation, which in turn induce an electrical voltage in each receiver antenna. Due to geometric spreading and absorption by the surrounding earth formation, the induced voltages in the receiving antennas have different phases and amplitudes. Experiments have shown that the phase difference ($\Phi$) and amplitude ratio (attenuation, A) of the induced voltages from any two receiver antennas are indicative of the resistivity of the formation. The depth of investigation (as defined by an averaged radial distance from the tool axis) to which such a resistivity measurement pertains is a function of the frequency of the transmitter and the distance from the transmitter to the mid-point between the two receivers. Thus, one may achieve multiple radial depths of investigation of resistivity either by providing multiple transmitters at different distances from the receiver pair or by operating a single transmitter at multiple frequencies.

Many formations are electrically anisotropic, a property which is generally attributable to extremely fine layering during the sedimentary build-up of the formation. Hence, in a formation coordinate system oriented such that the x-y plane is parallel to the formation layers and the z axis is perpendicular to the formation layers, resistivities $R_x$ and $R_y$ in directions x and y, respectively, are the same, but resistivity $R_z$ in the z direction may be different from $R_x$ and $R_y$. Thus, the resistivity in a direction parallel to the plane of the formation (i.e., the x-y plane) is known as the horizontal resistivity, $R_h$, and the resistivity in the direction perpendicular to the plane of the formation (i.e., the z direction) is known as the vertical resistivity, $R_v$. The index of anisotropy, $\eta$, is defined as $\eta=[R_v/R_h]^{1/2}$.

The relative dip angle, $\theta$, is the angle between the tool axis and the normal to the plane of the formation. Resistive anisotropy and relative dip angle each have significant effects on resistivity logging tool measurements. As a result, resistivity logging systems should account for formation anisotropy and relative dip if accurate resistivity logs are to be obtained. To facilitate the determination of the anisotropic resistivity parameters, at least one of the transmit or receive antennas is tilted or oriented transversely to the tool axis to introduce an azimuthal sensitivity, and in practice it is becoming common to configure multiple ones of the transmitter and receiver antennas as multi-component antennas. Moreover, at least some multi-component resistivity logging systems also acquire measurements using multiple signal frequencies.

Often, an inversion process is employed to derive the formation parameters from the resistivity tool measurements. In an inversion process, the tool measurements are compared to synthetic measurements derived from a parameterized formation model, and the model parameters are adjusted until a match is achieved. Though the increased number of measurements offered by multi-spacing, multi-frequency, and multi-component logging tools creates the potential for increased model complexity and improved system performance, the resulting inversion problem creates new challenges for finding a suitable balance between accuracy and simplicity. Accurate inversions generally require a higher model complexity (with a correspondingly enlarged parameter space) that that renders their use infeasible in at least some situations (e.g., real time monitoring, embedded systems). Conversely, simple inversion models generally provide significantly reduced computational burdens, but in at least some situations (e.g., thin beds, horizontal boreholes) the results are insufficiently accurate.

BRIEF DESCRIPTION OF THE DRAWINGS

Accordingly, there are disclosed herein specific multi-component induction (MCI) logging systems and methods that employ selected-frequency inversion in a manner that provides sufficient inversion accuracy without any unwarranted increases in computational complexity. In the drawings:

FIG. 3D is a function block diagram of an illustrative MCI logging system.

FIGS. 5A-5B show parameters of an illustrative radial model for inversion.

FIG. 6 shows parameters of an illustrative vertical model for inversion.

FIG. 8 is a flow diagram of an illustrative selective frequency inversion method.

FIGS. 9A-9D show illustrative formation resistivity dependencies for inversion weighting.

Figure 1:
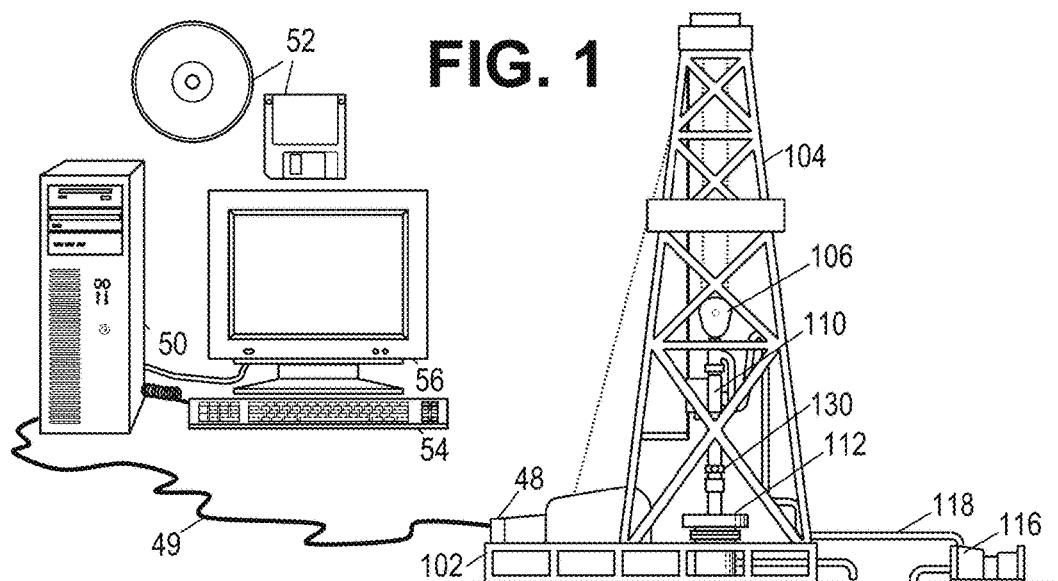
FIG. 1 shows an illustrative logging while drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The following disclosure provides an efficient yet relatively accurate estimation of formation properties from measurements obtained by multi-frequency, multi-component array induction tools. Both simulations and experiments indicate that better inversion results are achieved using shorter spacings/lower frequencies in certain regions and short-to-middle spacings/higher frequencies in other regions. The present disclosure exploits this observation alone or in combination with the use of multiple inversion models (e.g., a radial 1D model and a vertical 1D model) to obtain a suitable balance between inversion speed and accuracy.

FIG. 1 shows a suitable context for describing the operation of the disclosed systems and methods. In the illustrated logging while drilling (LWD) environment, a drilling platform 102 is equipped with a derrick 104 that supports a hoist 106 for raising and lowering a drill string 108 through the well head 112. A top drive 110 rotates the drill string 108 to drill the borehole as far as the length of the drill string allows. The drill string 108 is periodically extended by temporarily anchoring the drill string 108 at the well head 112 and using the hoist 106 to position and attach new drill pipe sections with threaded connectors 107.

Connected to the lower end of the drill string 108 is a drill bit 114. As the drill bit 114 rotates, it creates a borehole 120 that passes through various formations 121. A pump 116 circulates drilling fluid through a supply pipe 118 to top drive 110, through the interior of drill string 108, through orifices in drill bit 114, back to the surface via the annulus around drill string 108, and into a retention pit 124. The drilling fluid transports cuttings from the borehole into the pit 124 and aids in maintaining the integrity of the borehole 120.

Drilling fluid, often referred to in the industry as "mud", is often categorized as either water-based or oil-based, depending on the solvent. Oil-based muds are generally preferred for drilling through shaley formations, as water-based muds have been known to damage such formations.

A multi-component induction (MCI) logging tool 126 is integrated into the bottom-hole assembly near the drill bit 114. The MCI logging tool 126 may take the form of a drill collar, i.e., a thick-walled tubular that provides weight and rigidity to aid the drilling process. As the drill bit 114 extends the borehole 120 through the formations, the logging tool 126 (and other downhole sensors in the bottomhole assembly 129) collects multi-component induction measurements as well as measurements of the tool orientation and position, borehole size, drilling fluid resistivity, and various other drilling conditions.

The orientation measurements may be performed using an orientation indicator, which may include magnetometers, inclinometers, and/or accelerometers, though other sensor types such as gyroscopes may be used. Preferably, the orientation indicator includes a 3-axis fluxgate magnetometer and a 3-axis accelerometer. As is known in the art, the combination of those two sensor systems enables the measurement of the rotational ("toolface") angle, borehole inclination angle (aka "slope"), and compass direction ("azimuth"). In some embodiments, the toolface and borehole inclination angles are calculated from the accelerometer sensor output. The magnetometer sensor outputs are used to calculate the borehole azimuth. With the toolface, the borehole inclination, and the borehole azimuth information, multi-component induction logging tools disclosed herein can be used to steer the bit to and along the desirable bed.

In wells employing acoustic telemetry for LWD, the MCI logging tool 126 and other downhole sensors are coupled to the telemetry module 128 having an acoustic telemetry transmitter that transmits telemetry signals in the form of acoustic vibrations in the tubing wall of drill string 108. An acoustic telemetry receiver array 130 may be coupled to tubing below the top drive 110 to receive transmitted telemetry signals. One or more repeater modules 132 may be optionally provided along the drill string to receive and retransmit the telemetry signals. Alternative LWD telemetry techniques exist and can be employed, including mud pulse telemetry, electromagnetic telemetry, and wired drill pipe telemetry. Many telemetry techniques also offer the ability to transfer commands from the surface to the bottomhole assembly 129, thereby enabling adjustment of the tool's configuration and operating parameters. In some embodiments, the telemetry module 128 also or alternatively stores measurements for later retrieval when the bottomhole assembly 129 returns to the surface.

A drilling equipment interface 48 facilitates communication between the surface components of the telemetry system and a processing system 50, shown here in the form of a desktop computer coupled to the drilling equipment interface 48 via a cable 49. In other embodiments, the processing system 50 may be a tablet, laptop computer, a remote processing center, or even a virtual computer, any of which may be coupled to retrieve the logging tool measurements via a computer network and/or a wireless communications link. Software (shown in FIG. 1 as portable information storage media 52), once loaded into internal memory and executed by the processor(s), configures the processing system 50 to derive estimated formation parameters from the logging tool measurements and to responsively provide a visual representation of the estimated parameters on a display 56, a printer, or other device for providing a perceptible output. A keyboard 54 or other input device enables a user to interact with the processing system and thereby achieve at least some control of the displayed information to facilitate a greater understanding of the presented information. Normally the formation parameter estimates are presented as formation logs having multiple tracks each displaying a formation parameter's dependence on depth or borehole position.

Figure 2:
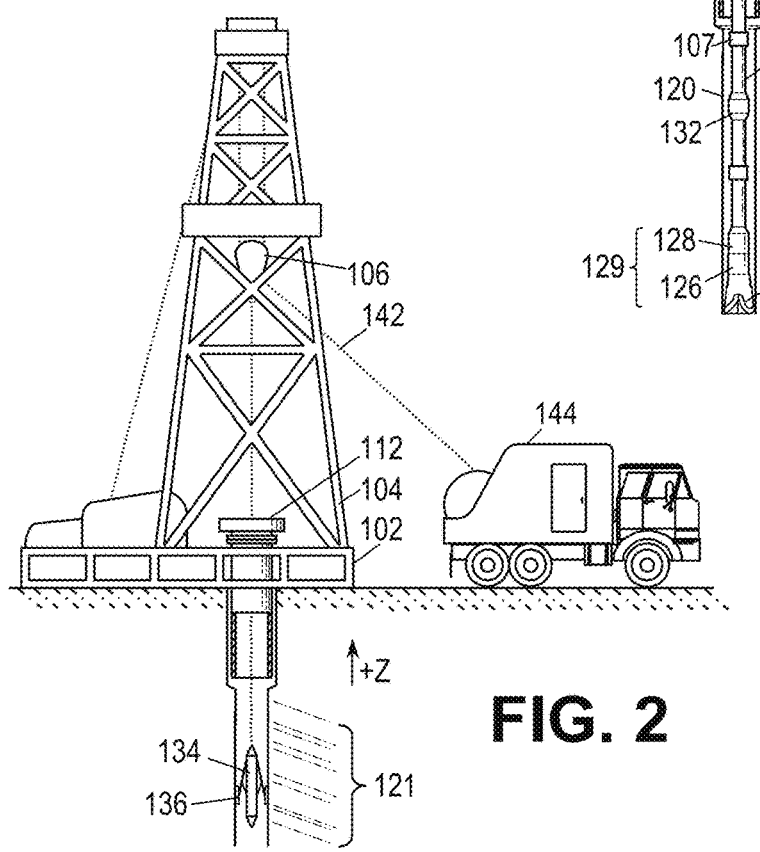
FIG. 2 shows an illustrative wireline logging environment.

At various times during the drilling process, the drill string 108 is removed from the borehole as shown in FIG. 2. Once the drill string has been removed, logging operations can be conducted using a wireline logging tool 134, i.e., a sensing instrument sonde suspended by a cable 142 having conductors for transporting power to the tool and telemetry from the tool to the surface. A multi-component induction logging portion of the logging tool 134 may have centralizing arms 136 that center the tool within the borehole as the tool is pulled uphole. A logging facility 144 collects measurements from the logging tool 134, and includes a processing system 50 for processing and storing the measurements gathered by the logging tool.

Figure 3A:
FIG. 3A shows an illustrative antenna configuration for a logging while drilling MCI logging tool.

FIG. 3A shows an illustrative MCI logging tool 126 having antennas for acquiring multi-component induction logging measurements. A multi-component transmit antenna 302 includes three orthogonal antennas that can be operated in sequence to induce electromagnetic currents in the surrounding formation, in accordance with the distributed conductivity of the formation. Axial antennas 304, 306, and/or multicomponent receive antennas 308, 310, 312, 314, enable multiple measurements of each of the resulting fields. The transmit-receive antenna spacings are some of the design parameters that may be varied to adjust the tool's measurement resolution and depth of investigation. The tool may acquire attenuation and phase measurements of each receive antenna's response to transmit antenna 302. In certain alternative embodiments, the tool measures in-phase and quadrature-phase components of the receive signals rather than measuring amplitude and phase. In either case, these measurements are collected and stored as a function of the tool's position and rotational orientation in the borehole.

Figure 3B:
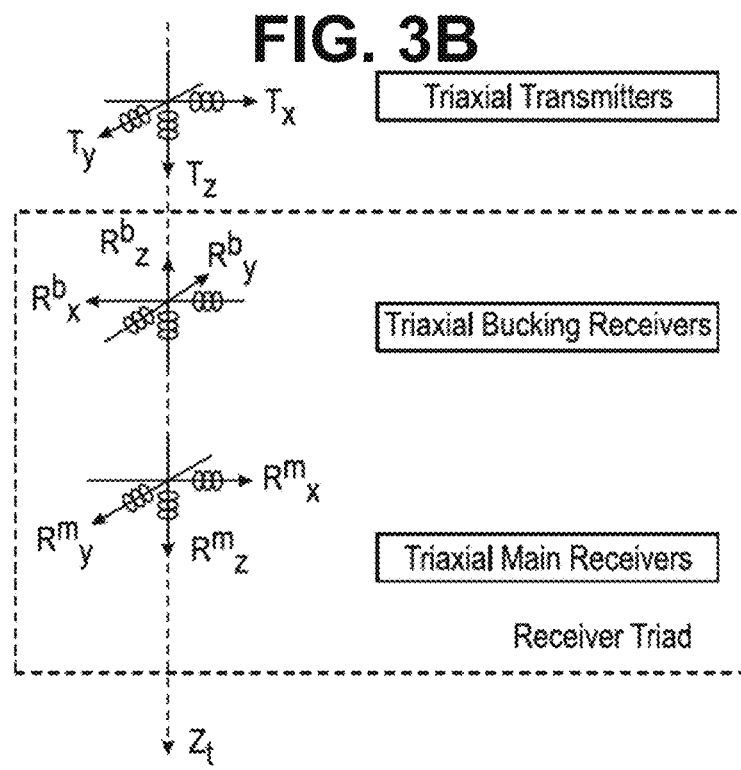
FIG. 3B shows a schematic representation of a given multi-component transmit-receive antenna arrangement.

The illustrated tool has receive antennas 304 and 306 coaxial with the tool, making them parallel to the Z-axis component of the transmit antenna 302. Each multicomponent receive antenna 308-314 is, in accordance with the model shown in FIG. 3B, oriented to maintain each of its components parallel to the corresponding component of the transmit antenna 302. Each component of the multicomponent receive antenna includes a main coil and a bucking coil each oriented parallel to the corresponding transmitter coil, and spaced apart along the tool's axis. In FIG. 3B, triad of transmitter coils $T_x$, $T_y$, $T_z$, represent magnetic dipole antennas oriented parallel to the tool's X, Y, and Z axes respectively (the tool's coordinate system). A triad of main receiver coils $R_x^m, R_y^m, R_z^m$ similarly represent magnetic dipole antennas oriented along these axes, as do a triad of bucking receiver coils $R_x^b, R_y^b, R_z^b$. The tool dimensions and antenna spacings are subject to a great deal of variation depending on the desired tool properties. The distance between the main receive and bucking coils may be on the order of 0.25 m, while the spacing of the transmit coil to the midpoint between the main receive and bucking coil pairs may vary from about 0.4 m to over 10 m.

Figure 3C:
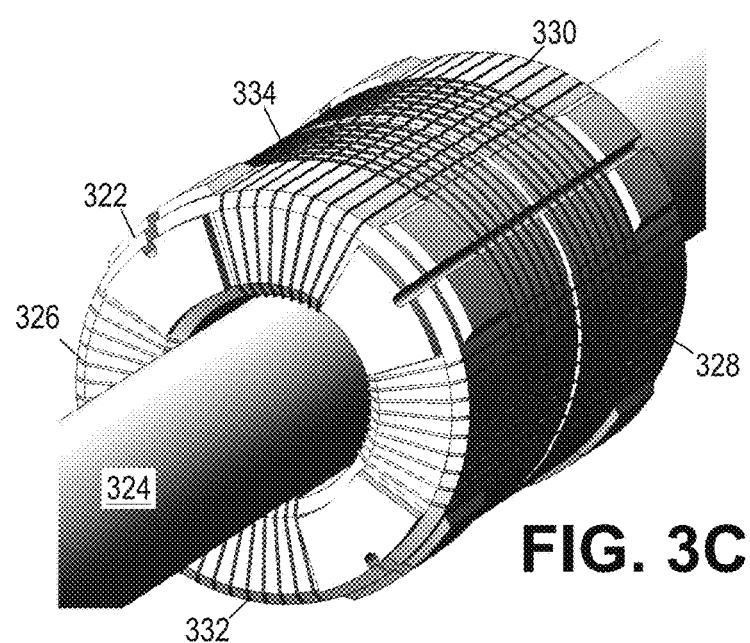
FIG. 3C shows an illustrative triaxial antenna.

In the illustrative tool embodiments, each of the antennas surrounding the tool is mounted in a recess and protected by anon-conductive filler material and/or a shield having apertures of a non-conductive material. The tool body is primarily composed of a highly conductive material, such as steel. As shown in FIG. 3C, the antenna coil triads may each be wound on a winding form 322 around an inner tubular 324. In LWD tool embodiments, the inner tubular houses the flow passage for drilling fluid, whereas in wireline tool embodiments the inner tubular houses the tool electronics and wiring. Sensitivity to magnetic fields along an X-axis is provided by two coils 326, 328, while sensitivity along a Y-axis is provided by two coils 330, 332. A co-axial coil 334 provides sensitivity along Z-axis. Other triaxial antenna configurations are also suitable and may be employed.

Returning to FIG. 3B, the main receiver triad is spaced at a distance $L_m$ from the transmitter triad, and the bucking receiver triad is spaced at a distance $L_b$ from the transmitter triad. The signal measurements of each coil in the bucking receiver triad can be subtracted from the corresponding coil in the main receiver triad to eliminate the direct field signal from the transmitter and thereby increase sensitivity to formation properties. As explained by Moran and Gianzero, in "Effects of Formation Anisotropy on Resistivity Logging Measurements" Geophysics, Vol. 44, No. 7, p. 1266 (1979), the magnetic field h in the receiver coils with a given signal frequency can be represented in terms of the magnetic moments m at the transmitters and a coupling matrix C:

$$h = C\,m \qquad (1)$$

In express form, equation (1) is:

$$\begin{bmatrix} H_x \\ H_y \\ H_z \end{bmatrix} = \begin{bmatrix} C_{xx} & C_{xy} & C_{xz} \\ C_{yx} & C_{yy} & C_{zz} \\ C_{zx} & C_{zy} & C_{zz} \end{bmatrix} \begin{bmatrix} M_x \\ M_y \\ M_z \end{bmatrix}, \qquad (2)$$

where $M_X$, $M_Y$, and $M_Z$ are the magnetic moments (proportional to transmit signal strength) created by transmitters $T_x$, $T_Y$, and $T_Z$, respectively. $H_X$, $H_Y$, $H_Z$ are the magnetic fields (proportional to receive signal strength) at the receiver antennas $R_X$, $R_Y$, and $R_Z$, respectively.

In the antenna configuration of FIG. 3B, if each transmitter is fired in turn, and signal measurements are made at each receiver in response to each firing, nine differential measurements ($T_j R_i^m - T_j R_i^b$, ij ∈ {x,y,z}) are obtained. These nine frequency-dependent transmit-receive antenna coupling measurements enable the determination of a complete coupling matrix C. ($C_{ij}=a_{ij}V_{ij}$, where i is the index for receiver axis x, y, z, and j is the index for transmitter axis x, y, z, $a_{ij}$ is a constant determined by the tool design, and $V_{ij}$ is a complex value representing the signal amplitude and phase shift measured by receiver i in response to the firing of transmitter j.) Thus for each signal frequency and antenna spacing employed, the measured voltage tensor can be expressed:

$$\overline{V} = (V_{ij})_{(3\times 3)} = \begin{pmatrix} V_{xx} & V_{xy} & V_{xz} \\ V_{yx} & V_{yy} & V_{yz} \\ V_{zx} & V_{zy} & V_{zz} \end{pmatrix}. \qquad (3)$$

As in conventional induction logging, the elements of the measured voltage tensor can be calibrated into an apparent conductivities to obtain the following apparent-conductivity tensor expression:

$$\overline{\sigma}_a = (\sigma_{ij})_{(3\times 3)} = \begin{pmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{pmatrix}. \qquad (4)$$

As with the coupling matrix elements, the apparent conductivities are each related to the corresponding measured voltage tensor elements via a calibration factor $K_{ij}$:

$$\sigma_{ij} = K_{ij} V_{ij}, \qquad (5)$$

where $K_{ij}$ are the calibration factors as determined by a calibration experiment. With a tool design that employs collocated transmit antennas and collocated receive antennas, the calibration factors for a given transmit-receive antenna subarray usually satisfy the following relations:

$$K_{xx} = K_{yy}, K_{xy} = K_{yx} \qquad (6a)$$

$$K_{xz} = K_{yz} = K_{zx} = K_{zy} \qquad (6b)$$

yielding only three independent calibration factors per frequency: $K_{xx}$, $K_{zz}$, and $K_{xz}$. Calibration may be done in such a way that the conductivity reading of the tool in homogeneous formation without the borehole would match the true conductivity of the formation. (While conductivity and resistivity are not interchangeable (their values are inverses of each other), they are treated herein as functional equivalents because knowledge of either one dictates the value of the other.)

FIG. 3D is a function block diagram of an illustrative logging system that includes MCI logging tool 126. A processing system (e.g., processing system 50 in FIG. 1) includes a processor 342 coupled via a bridge 346 to a system bus 340 and a memory 344 having logging and inversion software. The bus 340 enables the processor 342 to access and control the various other system components so that as the processor 342 executes the software, the processor 342 is responsively able to, among other things, interact with a user via a keyboard or other input device 350 and a monitor or other output device 352. A nontransient information storage medium 348 (such as a magnetic disk or solid state drive) supplements the memory 344 to provide long term storage of the software and data where the processor 342 can readily access it.

The software configures the processor 342 to obtain data from the MCI logging tool for inversion to estimate formation parameters and display them to a user in the form of formation logs. The processor 342 accesses the data using an interface 354 (such as a network interface card) that is coupled via any of the previously mentioned telemetry systems 356 to a downhole tool interface 358.

Figure 7:
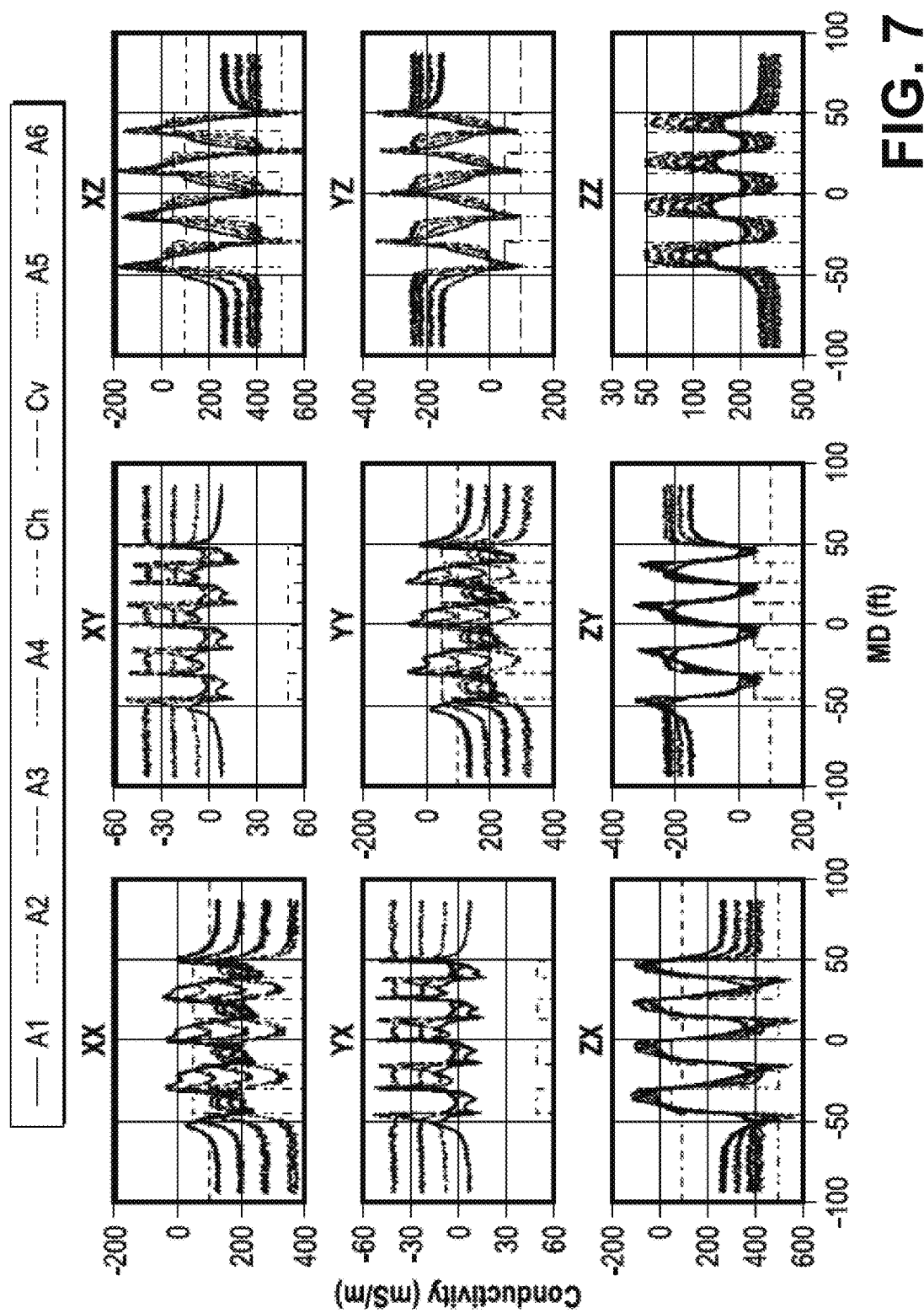
FIG. 7 shows illustrative graphs of MCI logging tool measurements.

In the MCI logging tool, a tool controller 364 is coupled by a bridge 368 to a tool memory 366 and a tool bus 362. The tool bus 362 enables the controller 364 to access and control the various other system components so that as the controller executes software in memory 366, the software configures the controller to respond to commands received via the interface 358, to obtain measurements, and to communicate those measurements to via the interface 358 to the uphole portion of the system. To obtain measurements, the controller 364 configures and enables the transmit unit 370, which in turn drives transmit antennas 372 in a suitable fashion to transmit electromagnetic signals into the surrounding formations. The controller 364 further configures and enables the data acquisition unit 376 to digitize and store measurements of signals detected via receive antennas 374. The controller 364 may perform in-situ processing of the measurements to reduce demands on storage and telemetry bandwidth. Such processing may include the determination of the apparent conductivities as given in equations 4 & 5 above. FIG. 7 provides an illustrative example of such apparent conductivities as a function of position, and will be discussed in greater detail below.

Figure 4:
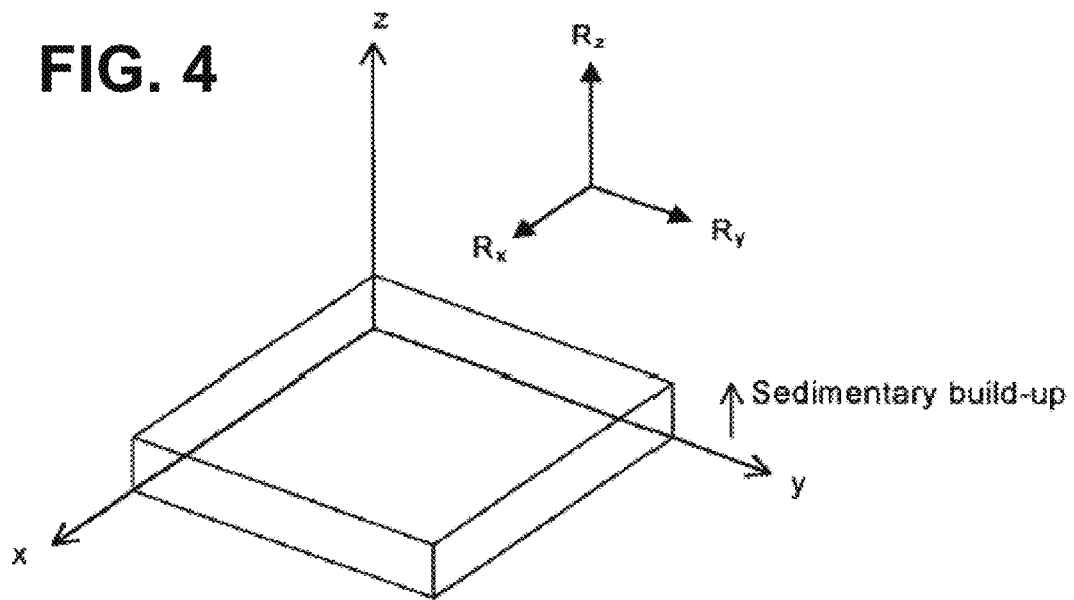
FIG. 4 is a schematic perspective view of a Cartesian coordinate system in a sedimentary earth formation.

Referring momentarily back to FIGS. 1 and 2, note that formations 121 are not perpendicular to the borehole, a situation that may occur naturally or may occur due to directional drilling operations. When measuring formation resistivity and orientation, it is convenient to use the formation coordinate system shown in FIG. 4. FIG. 4 shows a portion of a sedimentary formation bed, with the z-axis oriented perpendicular to the plane of the formation, i.e., in the direction of the sedimentary accretion. The formation resistivity when measured along this axis is often different than formation resistivity measured in the x-y plane. In a dipping bed, the x-axis may be chosen to be oriented in the direction of deepest ascent, i.e., "uphill or downhill". In a horizontal bed, the x-axis may be chosen to be oriented north.

In addition to the tool coordinate system and the formation coordinate system, a third coordinate system is employed herein. The borehole coordinate system has a z-axis that follows the central axis of the borehole. The x-axis of the borehole extends perpendicularly from the central axis through the low side of the borehole. (In a vertical borehole, the x-axis extends through the north side of the borehole.) The y-axis extends perpendicular to the other two axes in accordance with the right-hand rule. The borehole coordinate system is related to the tool coordinate system in that their z-axes are aligned (though possibly offset). The orientation sensors measure the rotation of the tool's x- and y-axes relative to those of the borehole, enabling the tool's coupling measurements to be readily translated into the borehole's coordinate system.

Figure 5A:
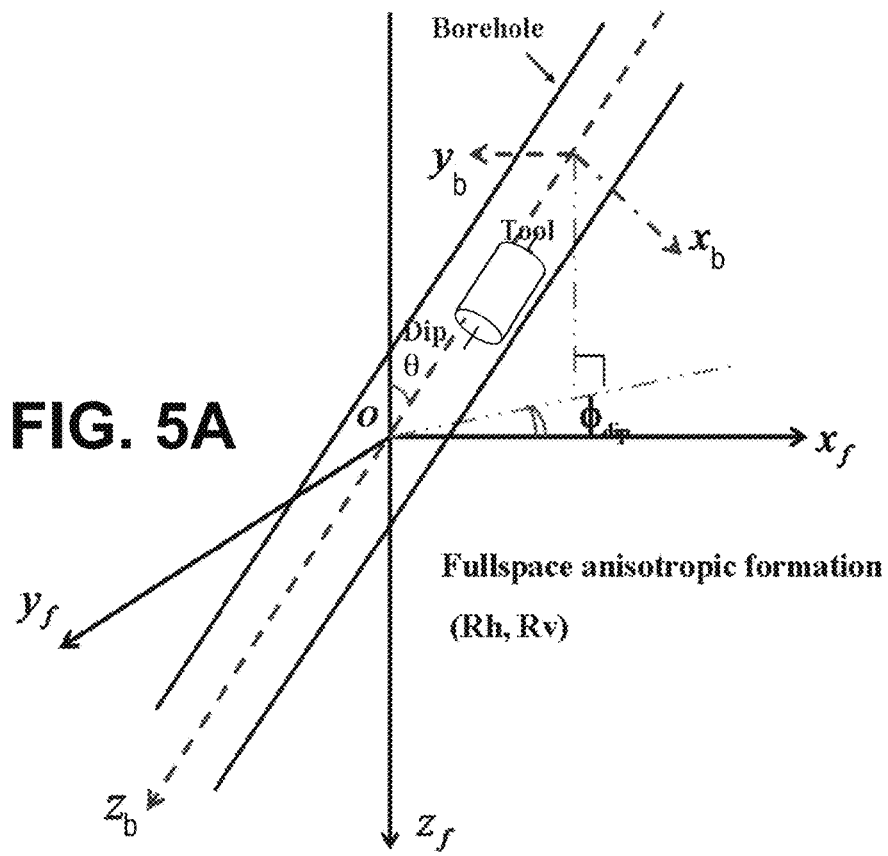

With these coordinate systems in mind, there are a number of formation models that may be employed individually or in combination to derive estimates of formation parameters from the tool measurements. FIGS. 5A-5B show parameters of a first illustrative formation model (hereafter, the "one-dimensional radial", "Radial1D", or simply "radial" model) suitable for use in estimating formation parameters of interest. The illustrated model assumes an infinite, homogeneous formation having a vertical transverse isotropic (VTI) resistivity, i.e., a formation that is resistively anisotropic with a horizontal resistivity Rh and a vertical resistivity Rv. A borehole through the formation has a central axis that crosses through the origin of the formation coordinate system. The angle between the borehole's z-axis and the formation's z-axis is the dip angle θ. The angle between the formation's x-axis and the projection of the borehole's z-axis on the horizontal plane is the dip azimuth, or "strike" angle Φ. FIG. 5B is a cross-section of the borehole taken perpendicular to the central axis. The multi-component induction tool is shown displaced from the borehole's central axis by an eccentricity distance $d_{ecc}$ in the direction of an eccentricity azimuth $\phi_{ecc}$. Two such azimuths eccentricity are shown, with one ($\phi_{ecc}$) measured relative to the borehole x-axis, and a second, strike-offset eccentricity azimuth $\phi^s_{ecc}$ measured relative to the formation x-axis. The borehole diameter $D_{hole}$ and the invasion region diameter $D_{inv}$ are also shown. (The invaded region is a region around the borehole where the borehole fluid has altered the resistivity from that of the native formation.) The radial model assumes no variation along the borehole z-axis, and the only modeled asymmetries are the tool eccentricity and resistive anisotropy of the formation.

In summary, the equations for the radial model assume concentric cylinders of resistivity, with an allowance for a tool eccentricity. The cylinders may correspond to the tool body, the borehole, the invaded region, and the surrounding formation. Some embodiments may omit the cylinder representing the invaded region, or include additional cylinders to model variation within the invaded region. An illustrative set of formation parameters that may be estimated using the radial formation model includes formation dip θ, dip azimuth $\phi_{dip}$, horizontal resistivity $R_h$, and vertical resistivity $R_v$, and may further include tool eccentricity $d_{ecc}$, eccentricity azimuth $\phi_{ecc}$ or $\phi^s_{ecc}$, borehole diameter $D_{hole}$, borehole fluid resistivity $R_{hole}$, invaded region diameter $D_{inv}$, and invaded region resistivity $R_{inv}$.

To contrast with the radial formation model, FIG. 6 shows a vertically layered, anisotropic formation model which increases the level of complexity by providing for horizontal formation bedding layers having respective resistivities. In so-called "one-dimensional vertical" or "Vertical1D" formation models, the existence of the borehole is neglected because borehole effects on tool response may be removed or significantly reduced by appropriate processing. For illustrative purposes, FIG. 6 shows a Vertical1D formation model with specific bed boundary locations and specific horizontal and vertical resistivity values for each bed. In practice the boundary locations and bed resistivities are parameters that would be determined as part of the inversion. Because the number of bedding layers can get quite large, a preferred processing approach for vertical model-based inversion employs a sliding window. The sliding window enables the processing system to consider just a small number of layers on either side of the current layer of interest, treating everything beyond the window as a uniform background. Some implementations of vertical model based inversion consider only one layer on either side of the current layer, for a window width of three layers. Other implementations consider two layers on either side of the current layer, for a window width of five layers. Greater window widths are possible, though the greater number of model parameters increases the computational burden associated with the inversion process. An illustrative set of formation parameters that may be estimated using the vertical formation model includes formation dip θ, dip azimuth $\phi_{dip}$, horizontal resistivity $R_h$, and vertical resistivity $R_v$, and may further include bed boundary positions.

Using the illustrated formation model of FIG. 6, i.e., a formation having layers of gradually varying thickness that alternate between a homogeneous resistivity of 20 Ωm (which translates to a conductivity of 50 mS) and an anisotropic resistivity with Rh=2 Ωm (500 mS) and Rv=10 Ωm (100 mS), a run of the MCI logging tool 126 was simulated. FIG. 7 shows the resulting set of logs. The nine graphs correspond to the nine components of the apparent conductivity tensor (Eq 4), with each graph showing curves A1-A4 for the four multicomponent arrays (using receive antennas 308-314) and curves Ch and Cv for the horizontal and vertical conductivities of the model. (The graph for the ZZ component further shows curves A5, A6 for the coaxial antennas 304, 306.) These logs are representative of the tool measurements that would be used as inputs to the inversion process described below.

Another inversion model is the well-known homogeneous or "ZZ" formation model. As indicated by the name, this inversion model assumes that the tool is located in an infinite, homogeneous, and isotropic formation, and acquires measurements with only coaxial transmit and receive antennas. While in some cases the model accounts for the presence of a borehole, no consideration is made for possible eccentering.

For the illustrative MCI logging tool, the number measurements associated with a given position in the borehole is 38 (nine triaxial component measurements with four antenna arrays and two coaxial antenna array measurements). With the possibility of additional antenna spacings and additional signal frequencies, the number of measurements can be even higher. The greater number of measurements may enable the logging system to provide accurate formation parameter estimates over a greater range of measurement environments.

However, it has been found that the contribution of individual measurements to an accurate parameter estimation varies with the different environments. For example, in relatively conductive formations, the so-called "skin effect" greatly reduces the value of the measurements from the long-spaced antenna arrays relative to those of the short-spaced antenna arrays. Conversely, in relatively resistive formations, the spatial resolution achieved by the short-spaced and middle-spaced antenna arrays greatly enhances the value of their measurements relative to those of the long-spaced antenna arrays. In the meantime, in relatively conductive formations, lower frequency channels suffer less attenuation, are less susceptible to phase wrapping, and have less borehole effects. On the other hand, in relative resistive formations, higher frequency channels normally have larger signal-to-noise ratio, which allows for accurate processing. Though a full inversion of all measurements in all situations would yield a comprehensive solution, it would appear to create unnecessary computational burdens on the logging system. Accordingly, the proposed inversion process below adapts to the circumstances to invert only those measurements deemed most helpful to an accurate estimate of the formation parameters.

FIG. 8 is a flowchart of an illustrative logging method. The illustrated method may be implemented by the systems illustrated in FIGS. 1, 2, and 3D. Alternatively, systems such as those illustrated in FIGS. 1, 2, and 3D may acquire the data and communicate it to a remote workstation where the remaining portion of the illustrative method is carried out.

The logging method begins in block 802 with the conveyance of a multi-component induction logging tool along a borehole, e.g., as a wireline tool or a LWD tool. In block 804, as the tool is being conveyed along the borehole, it measures the components of the apparent conductivity tensor for each of the antenna arrays and signal frequencies as a function of the tool's position in the borehole. Tool calibration and temperature correction are normally applied during or shortly after the measurements are acquired. In at least some cases, the logging tool assembly further includes instruments to measure borehole diameter ($d_{hole}$) and borehole fluid resistivity $R_{hole}$. In block 806, the system preprocesses the conductivity tensor and borehole size logs. Such preprocessing can include adaptive low-pass filtering to remove high-frequency measurement noise and/or to correct for horn-effect at formation boundaries. In some cases, the boundary horns may be removed or reduced using the some combined logs as described in U.S. Pat. No. 6,819,112, titled "Method of combining vertical and horizontal magnetic dipole induction logs for reduced shoulder and borehole effects" by inventors Gianzero and Gao.

In block 808, the system inverts the tool measurements to obtain a first set of one or more formation parameter estimates based on a first formation model (such as the ZZ formation model described above). At each given position along the borehole, the model parameters are adapted to find the values that minimize a cost function. Representing the set of measurements $\sigma_{ij}^f$ at a given position p as $m_k(p)$, where k is an index ranging from 1 to K to represent each combination of receive antenna orientation i, transmit antenna orientation j, and frequency and/or spacing index value f the cost function can be expressed:

$$c(p) = \sum_{k=1,K} \|s_k(p) - m_k(p)\|^2$$

where $s_k(p)$ is the measurement predicted by the model based on the current model parameters. Where the model allows for the prediction to be calculated from a position-dependent (non-infinite) formation (e.g., the Vertical1D model), the cost function may be extended to account for the position dependence:

$$C(p) = \sum_{q=-Q,+Q} \sum_{k=1,K} \|w_q \cdot [s_k(p-q) - m_k(p-q)]\|^2$$

where the weights $w_q$ provide a symmetric window of width 2Q+1 around the current position p. Suitable window shapes implementable by the weights include rectangular, triangular, Hamming, Hanning, and Blackman.

Again, the inversion process is the determination of those model parameters that minimize the cost function. For the ZZ formation model, the set of one or more formation parameter estimates may be (isotropic) formation resistivity as a function of position. This initial estimate of formation resistivity can be employed in optional block 810 to tentatively identify boundaries between the beds. For example, regions of relatively stable resistivity values may correspond to beds, while the in-between regions indicate boundaries.

Other boundary detection methods are also known and may be used, such as identifying boundary horns in the raw data, etc.

Also in block 810, the system may select measurement weight coefficients for the cost function in the subsequent inversion(s). When measurement weight coefficients are included, the cost functions become:

$$c(p) = \sum_{k=1,K} w_k(p) \| [s_k(p) - m_k(p)] \|^2$$

$$C(p) = \sum_{q=-Q,+Q} \sum_{k=1,K} w_k(p) \| w_q \cdot [s_k(p-q) - m_k(p-q)] \|^2$$

where the set of measurement weight coefficients $w_k(p)$ is chosen based on initial formation resistivity estimates at the given borehole position p. Below, the vector notation $w_f$ is used to represent all of the measurement weight coefficients associated with array f=1 to F, where F is the number of independent frequency and/or spacing-based measurements, i.e., the vector elements are the weight coefficients for different combinations of transmit/receive antenna orientations. FIGS. 9A-9D show how the elements of the different weight vectors can change to emphasize the contributions of different arrays at different formation conductivity values. (The estimated resistivity or conductivity from block 808 may be used as a basis for selecting the appropriate measurement weight coefficients.)

For example, FIG. 9A shows a low conductivity region 902 in which the elements of $w_1$ are one and the remaining measurement weight coefficients are zero, enabling, the measurements associated with the first antenna array (measurements from the shortest spacing and/or the lowest frequency) to drive the inversion process. A transition occurs in a slightly higher conductivity region 904, so that the elements of array weight coefficient vector $w_2$ increase from zero to one as the elements of $w_1$ fall from one to zero. The remaining measurement weight coefficients are zero in this region. In conductivity region 906 the elements of $w_2$ are one while the remaining measurement weight coefficients are zero. In this fashion, each weight coefficient vector has a window in which it is non-zero, each window potentially overlapping with windows for other weight coefficient vectors.

At each point along the conductivity axis, the measurement weight coefficients sum to a constant value. Subject to this constraint, the optimal width, placement, and shape of the windows for each weight coefficient vectors is determined by experimentation. For example, FIG. 9A shows different window widths for the intermediate array weight coefficient vectors $w_2$ and $w_3$. Moreover, if one of the measurement arrays is determined to be defective, the windows may be modified. In conductivity region 908 (FIG. 9B), weight coefficient vectors $w_3$ has been zeroed to eliminate the measurements of the third antenna array from consideration, and the transitions associated with the windows for weight coefficient vectors $w_2$ and $w_4$ have been adjusted to compensate for the absence of $w_3$.

The window shapes can be modified to provide different transitions between the measurements of different arrays, as indicated in FIGS. 9B-9D. It is expected that gradual transitions are preferable to the sudden transitions that would result from the used of rectangular windows, as such sudden transitions would likely result in the appearance of anomalies in the estimated formation parameters. Longer transitions, such as those shown in FIG. 9D, may offer increased resistance to such anomalies. Note that such elongated transitions may result in conductivity regions 910, 912 having more than two overlapping windows. In conductivity region 910, weight coefficient vectors $w_1$, $w_2$ and $w_3$, are non-zero, whereas in region 912, $w_2$, $w_3$, and $w_4$ are non-zero.

Returning to FIG. 8, in block 810 the system optionally determines tentative boundary locations and determines a tentative resistivity for the bed. The tentative resistivity estimate may be a formation resistivity estimate from the center of the bed or may be determined from statistical analysis of the estimates across the thickness of the bed (e.g., mean or median resistivity). Based on the tentative resistivity estimate for the bed, the system may select a suitable set of measurement weight coefficients for each bed.

In block 812, the system employs the full set of MCI measurements (as modified by the measurement weight coefficients) to derive an enhanced set of formation parameter estimates such as formation resistivity, dip, and strike, as a function of tool position. (The previous formation resistivity estimates may be used as the starting point for the Radial1D inversion model.) These enhanced estimates of formation resistivity, dip, and strike, can be employed in block 814 to identify or refine estimates of boundaries between the beds. As previously mentioned, regions of relatively steady parameter values may correspond to the same beds, while the in-between regions indicate boundaries. Other boundary detection methods are also known and may be used, such as using boundary horns in the raw data, etc.

In block 816, the system employs the boundary locations to select a processing window. The processing window has a specified width (e.g., two layers) above and below the current layer of interest. As processing proceeds from layer to layer, the processing window is progressively re-selected to maintain the layer of interest in the center.

In block 818, the system determines measurement weight coefficients based on the enhanced set of formation parameter estimates, as previously described with respect to optional block 810. In block 819, uses the measurement weight coefficients in the inversion cost function to perform a Vertical1D inversion, thereby obtaining further enhanced formation parameter estimates. The boundary locations and other estimated parameter values from previous inversions may be used to set the initial model parameter values for this inversion. For example the bed boundaries from block 814 may be used to define the layers in the vertical formation model, with each layer having an estimated resistivity and anisotropy derived from estimates from block 812 that correspond to the center of the layers, and with all layers sharing a common dip and strike derived by averaging the estimates from block 812 over the current processing window. During the inversion, each of these formation parameters, including the positions of the layer boundaries, is adjusted as needed to minimize the cost function.

Figure 10:
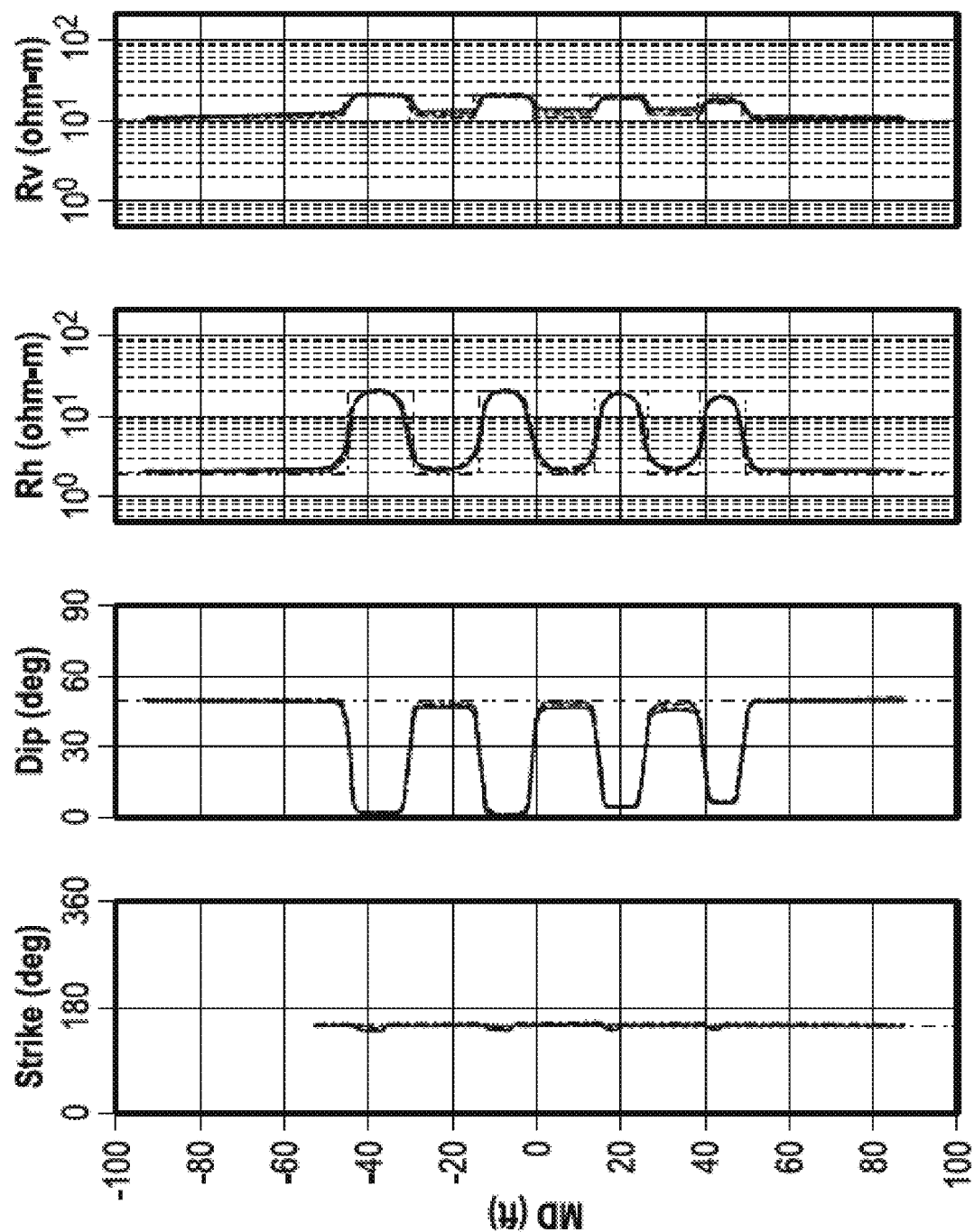
FIG. 10 shows illustrative formation resistivity logs.

In block 820, the estimated formation parameter values that minimize the cost function for the current layer of interest are stored. In block 822, the system determines if each of the formation layers have been processed and if not returns to block 816 to update the processing window and repeat blocks 816-822 for the next layer. In block 824, the stored parameter value estimates are displayed as logs. FIG. 10 shows and illustrative set of logs, including as a function of position: strike, dip, Rh, and Rv. Of course, formation resistivity and anisotropy can also be expressed using other logs, including one of Rh or Rv, together with a log of the anisotropy index or a ratio of the resistivities.

Embodiments disclosed herein include:

A: A logging method that comprises: obtaining multi-component transmitter-receiver coupling measurements from a logging tool conveyed along a borehole through a formation; deriving from said measurements one or more formation parameter estimates; determining measurement weight coefficients for a cost function based on said one or more formation parameter estimates; and inverting said measurements using said cost function to obtain one or more enhanced parameter estimates.

B: A logging system that comprises: a logging tool that when conveyed along a borehole through a formation obtains multi-component transmit-receive antenna coupling measurements with multiple arrays having different antenna spacings; and a processing system that operates on the measurement. The operating includes: deriving from said measurements one or more formation parameter estimates; determining measurement weight coefficients for a cost function based on said one or more formation parameter estimates; and inverting said measurements with said cost function to obtain one or more enhanced parameter estimates.

C: A nontransient information storage medium having software that, when executed by a processing system, causes the processing system to perform the method of Embodiment A.

Each of the embodiments A, B, and C may have one or more of the following additional elements in any combination: Element 1: displaying the one or more enhanced parameter estimates in log form. Element 2: the one or more enhanced parameter estimates include, as a function of position, formation resistivity, formation anisotropy, formation dip, and formation strike. Element 3: the one or more formation parameter estimates include, as a function of position, formation resistivity, and said weight coefficients are determined based on the formation resistivity. Element 4: the weight coefficients are grouped according to combinations of signal frequency and antenna array spacing, each group having a corresponding window profile that varies with formation resistivity. Element 5: At least some of the window profiles of Element 4 overlap, and at each formation resistivity value the window profiles sum to a constant value that does not depend on formation resistivity. Element 6: the window profiles of Element 4 favorably weight measurements from short-to-middle spacings or higher frequencies at higher formation resistivities while favorably weighting measurements from shorter spacings or lower frequencies at lower formation resistivities. Element 7: said deriving comprises calculating an apparent conductivity from said coupling measurements. Element 8: said inverting employs a one-dimensional radial formation model, and wherein said deriving comprises performing inversion with an isotropic homogenous formation model. Element 9: said inverting employs a layered anisotropic formation model, and wherein said deriving comprises performing inversion with a one-dimensional radial formation model.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed:

1. A logging method for inverting signals to derive formation parameters that comprises:

conveying a logging tool along a borehole through a formation, wherein the logging tool comprises:
a multi-component transmit antenna;
a plurality of axial antennas; and
a plurality of multicomponent receive antennas;
transmitting a signal at different frequencies from the multi-component transmit antennas;
measuring the signal with the plurality of multi-component receive antennas;
determining a multi-component transmitter-receiver coupling measurements from the measured signal;
deriving from said measurements one or more formation parameter estimates;
determining measurement weight coefficients for a cost function based on said one or more formation parameter estimates, wherein the one or more formation parameter estimates is the initial formation resistivity at a given borehole position;
inverting said measurements in a radial 1D inversion using said cost function to obtain one or more enhanced parameter estimates;
identifying bed boundaries;
selecting a processing window profile with a selected width from a current layer of interest; and
inverting said measurements in a vertical 1D inversion using said cost function to obtain one or more further enhanced parameter estimates.

2. The method of claim 1, wherein the one or more enhanced parameter estimates include, as a function of position, formation resistivity, formation anisotropy, formation dip, and formation strike.

3. The method of claim 1, wherein the one or more formation parameter estimates include, as a function of position, formation resistivity, and wherein said weight coefficients are determined based on the formation resistivity.

4. The method of claim 3, wherein the weight coefficients are grouped according to combinations of signal frequency and antenna array spacing, each group having the corresponding window profile that varies with formation resistivity.

5. The method of claim 4, wherein at least some of the window profiles overlap, and wherein at each formation resistivity value the window profiles sum to a constant value that does not depend on formation resistivity.

6. The method of claim 4, wherein the window profiles favorably weight measurements from short-to-middle spacings or higher frequencies at higher formation resistivities while favorably weighting measurements from shorter spacings or lower frequencies at lower formation resistivities.

7. The method of claim 1, wherein said deriving comprises calculating an apparent conductivity from said coupling measurements.

8. The method of claim 1, wherein said inverting employs a one-dimensional radial formation model, and wherein said deriving comprises performing inversion with an isotropic homogenous formation model.

9. The method of claim 1, wherein said inverting employs a layered anisotropic formation model, and wherein said deriving comprises performing inversion with a one-dimensional radial formation model.

10. A logging system for inverting signals to derive formation parameters that comprises:
a logging tool, wherein the logging tool is a multi-component induction logging tool comprising:
a transmitter antenna, wherein the transmitter antenna includes three orthogonal transmitter coils and wherein each of the three orthogonal transmitter coils are oriented parallel to the logging tool X-axes, Y-axes, or Z-axes;

a bucking receiver, wherein the bucking receiver includes three orthogonal bucking coils and wherein each of the three orthogonal bucking coils are oriented parallel to the logging tool X-axes, Y-axes, or Z-axes; and a main receiver antenna, wherein the main receiver antenna includes three orthogonal receiver coils, wherein each of the three orthogonal receiver coils are oriented parallel to the logging tool X-axes, Y-axes, or Z-axes, and when conveyed along a borehole through a formation obtains multi-component transmit-receive antenna coupling measurements with multiple arrays and multiple frequencies; and a processing system operating on said measurements, said operating including:

deriving from said measurements one or more formation parameter estimates;

determining measurement weight coefficients for a cost function based on said one or more formation parameter estimates, wherein the one or more formation parameter estimates is the initial formation resistivity at a given borehole position;

inverting said measurements in a radial 1D inversion with said cost function to obtain one or more enhanced parameter estimates;

identifying bed boundaries; and inverting said measurements in a vertical 1D inversion using said cost function to obtain one or more further enhanced parameter estimates.

11. The system of claim 10, wherein the one or more enhanced parameter estimates include, as a function of position, formation resistivity, formation anisotropy, formation dip, and formation strike.

12. The system of claim 10, wherein the one or more formation parameter estimates include, as a function of position, formation resistivity, and wherein said weight coefficients are determined based on the formation resistivity.

13. The system of claim 12, wherein the weight coefficients are grouped according to combinations of signal frequency and antenna array spacing, each group having the corresponding window profile that varies with formation resistivity.

14. The system of claim 13, wherein at least some of the window profiles overlap, and wherein at each formation resistivity value the window profiles sum to a constant value that does not depend on formation resistivity.

15. The system of claim 13, wherein the window profiles favorably weight measurements from short-to-middle spacings or higher frequencies at higher formation resistivities while favorably weighting measurements from shorter spacings or lower frequencies at lower formation resistivities.

16. The system of claim 10, wherein said deriving comprises calculating an apparent conductivity from said coupling measurements.

17. The system of claim 10, wherein said inverting employs a one-dimensional radial formation model, and wherein said deriving comprises performing inversion with an isotropic homogenous formation model.

18. The system of claim 10, wherein said inverting employs a layered anisotropic formation model, and wherein said deriving comprises performing inversion with a one-dimensional radial formation model.

* * * * *